United States Patent [19]

Akaike

[11] Patent Number: 5,401,290
[45] Date of Patent: Mar. 28, 1995

[54] APPARATUS FOR VAD WITH A VIBRATION DETECTOR TO ELIMINATE NATURAL VIBRATIONS

[75] Inventor: Nobuya Akaike, Yokohama, Japan

[73] Assignee: Sumitomo Electric Industries, Ltd., Osaka, Japan

[21] Appl. No.: 196,446

[22] Filed: Feb. 15, 1994

[30] Foreign Application Priority Data

Feb. 19, 1993 [JP] Japan .................. 5-055098

[51] Int. Cl.$^6$ .................... C03B 37/18; C03B 37/7
[52] U.S. Cl. ...................... 65/485; 65/486; 65/531; 65/144
[58] Field of Search .............. 65/381, 486, 531, 485, 65/29.18, 144, 377, 414

[56] References Cited

U.S. PATENT DOCUMENTS 4,419,116 12/1983 Nakahana ................ 65/485
4,707,173 11/1987 Kawazoe ................ 65/414

OTHER PUBLICATIONS

Patent Abstracts of Japan, vol. 12 No. 279 (C–517) 1 Aug. 1988.
Patent Abstracts of Japan, vol. 14, No. 215 (C–716) 8 May 1990.
Patent Abstracts of Japan, vol. 9, No. 331 (C–321) 25 Dec. 1985.

*Primary Examiner*—W. Gary Jones
*Assistant Examiner*—John Hoffmann
*Attorney, Agent, or Firm*—Sandler Greenblum & Bernstein

[57] ABSTRACT

An apparatus for producing a glass preform by VAD, includes a rotational drive device for rotating soot material, a detection device for detecting vibrations of the soot material, and a control device for controlling rotational speed of the rotational drive device. The control drive device changes the rotational speed of the rotational drive device on the basis of a detection output of the detection device.

3 Claims, 3 Drawing Sheets

APPARATUS FOR VAD WITH A VIBRATION DETECTOR TO ELIMINATE NATURAL VIBRATIONS

BACKGROUND OF THE INVENTION

1. Field of the Invention

The present invention relates to an apparatus for producing a glass preform and more particularly, to an apparatus for producing a glass preform by VAD (vapor phase axial deposition).

2. Description of Background Information

VAD is known as a method of producing a glass preform. The glass preform is produced by VAD as follows. A starting rod or a core rod is rotated by fixing an upper portion of the starting rod or the core rod to a shaft of a motor. Soot, which is caused by reactions of minute glass particles by an oxy-hydrogen burner containing gaseous raw materials, is grown axially on the rotating starting rod or the core rod and thus, porous glass acting as a core and a cladding is formed. The thus obtained porous glass is heated by a ring heater formed by high-purity carbon such that air bubbles contained in the glass particles, are forced out of the glass particles. As a result, a transparent optical fiber preform is obtained.

VAD includes a core forming step, in which porous glass acting as a core and a cladding is formed on a starting rod by gripping an upper portion of the starting rod. VAD also includes a jacketing step, in which, by gripping an upper portion of a core rod obtained by vitrifying the porous glass, soot is formed on the core rod sequentially downwardly so as to increase the diameter of the cladding. The jacketing step is performed for the purpose of setting a ratio of diameter of the core to that of the cladding to a proper value and is repeated a plurality of times in some cases.

In both the core forming step and the jacketing step, since soot is formed by gripping only the upper portion of the starting rod or the core rod, a lower portion of the starting rod or the core rod acts as a free end and thus, free vibrations of the starting rod or the core rod are likely to take place. As a result, uniform adherence of soot becomes difficult and thus, quality of the glass preform deteriorates.

As a countermeasure against vibrations of a rotor in a rotational machine, it has been a common practice that the number of rotations of the rotor and natural (e.g., resonant) frequency of the rotor are caused to deviate from each other. However, in sooting by VAD, since natural frequency of soot material obtained by depositing soot on the starting rod or the core rod varies with deposition of the soot, it is difficult to adopt this known countermeasure.

Therefore, in a sooting process of known VAD, no special consideration is given to the natural frequency of the soot material. Thus, even if vibrations of the soot material happen, the vibrations are allowed to continue until the soot material spontaneously deviates from a resonant state with the progress of deposition of soot.

Thus, in known VAD, variations of natural frequency of the soot material are not considered. In order to minimize causes of vibrations of the soot material, procedures that improve production accuracy have been pursued. For example, the starting rod or the core rod is performed prior to sooting so as to lessen the eccentricity of the soot material. However, these known procedures are quite troublesome and improvement of production accuracy is limited. Meanwhile, in response to a recent increase of size of the glass preform, variations of natural frequency of the soot material become greater, thereby resulting in an increased risk of resonance of the soot material.

SUMMARY OF THE INVENTION

Accordingly, an essential object of the present invention is to provide, with a view to eliminating the inconveniences of prior art, an apparatus for producing a glass preform by VAD, in which soot material is produced stably by minimizing vibrations of the soot material occurring at the time of sooting.

In order to accomplish this object of the present invention, an apparatus for producing a glass preform by VAD, according to the present invention comprises: rotational drive means for rotating soot material; detection means for detecting vibrations of the soot material; and control means for controlling rotational speed of the rotational drive means, which changes the rotational speed of the rotational drive means on the basis of detection output of the detection means.

When a resonant frequency of a dynamic system including the soot material coincides with a vibratory frequency of a rotational system including a drive motor during deposition of the soot material, the soot material reaches a resonant state and produces large vibrations.

In accordance with the present invention, rotational speed of the rotational drive means for rotating the soot material is controlled on the basis of vibratory state of the soot material detected by the detection means. Therefore, when vibrations of the soot material happen during deposition of the soot material, the vibratory state of the soot material can be terminated by changing the rotational speed of the soot material.

BRIEF DESCRIPTION OF THE DRAWINGS

This object and features of the present invention will become apparent from the following description taken in conjunction with the preferred embodiment thereof with reference to the accompanying drawing, in which.

In the description of the present invention it is noted that like parts are designated by like reference numerals throughout the accompanying drawings.

DETAILED DESCRIPTION OF THE PREFERRED EMBODIMENTS

Figure 1:
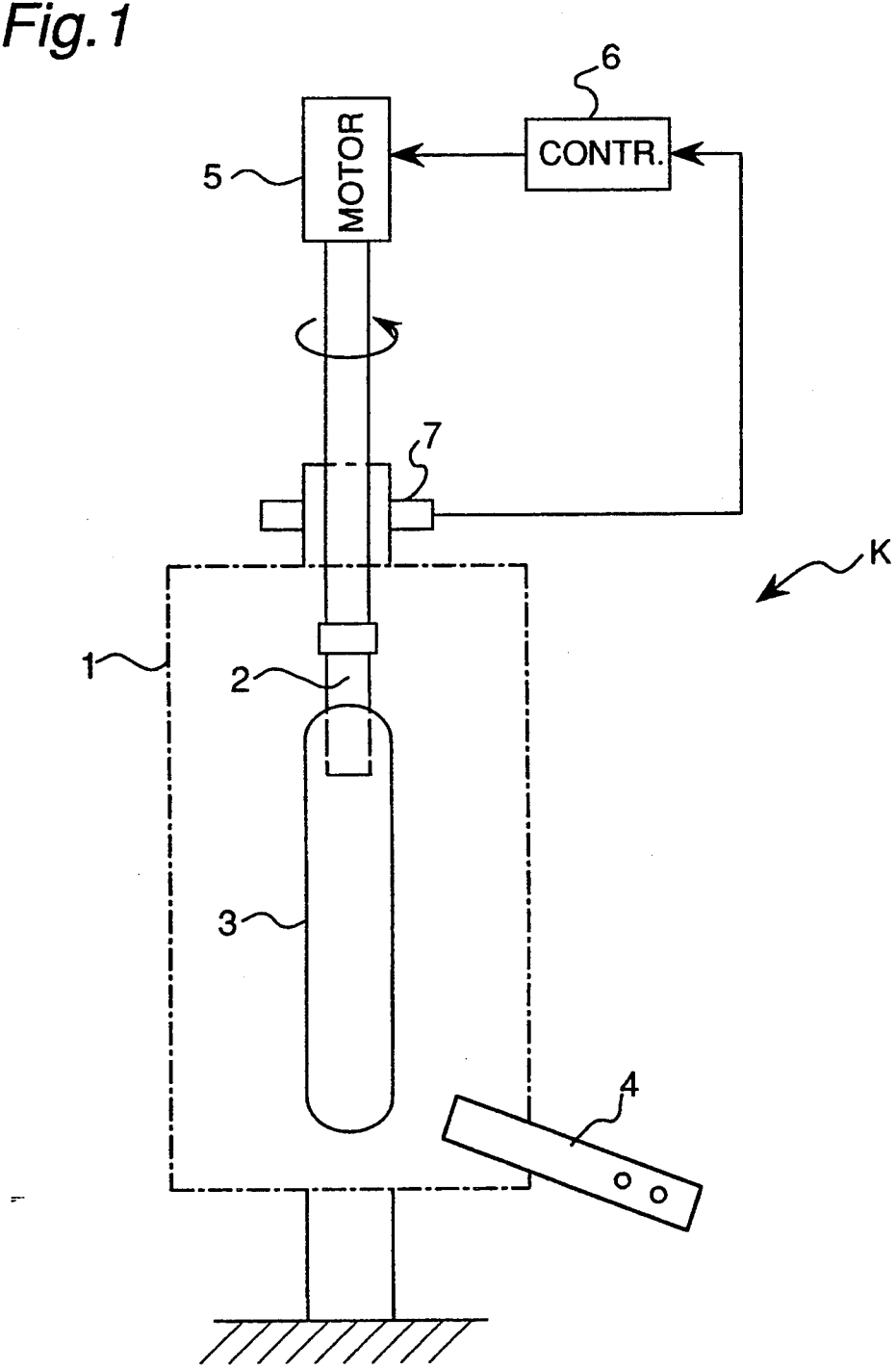
FIG. 1 is a schematic view showing a core forming step in an apparatus for producing a glass preform by VAD, according to one embodiment of the present invention.
Figure 2:
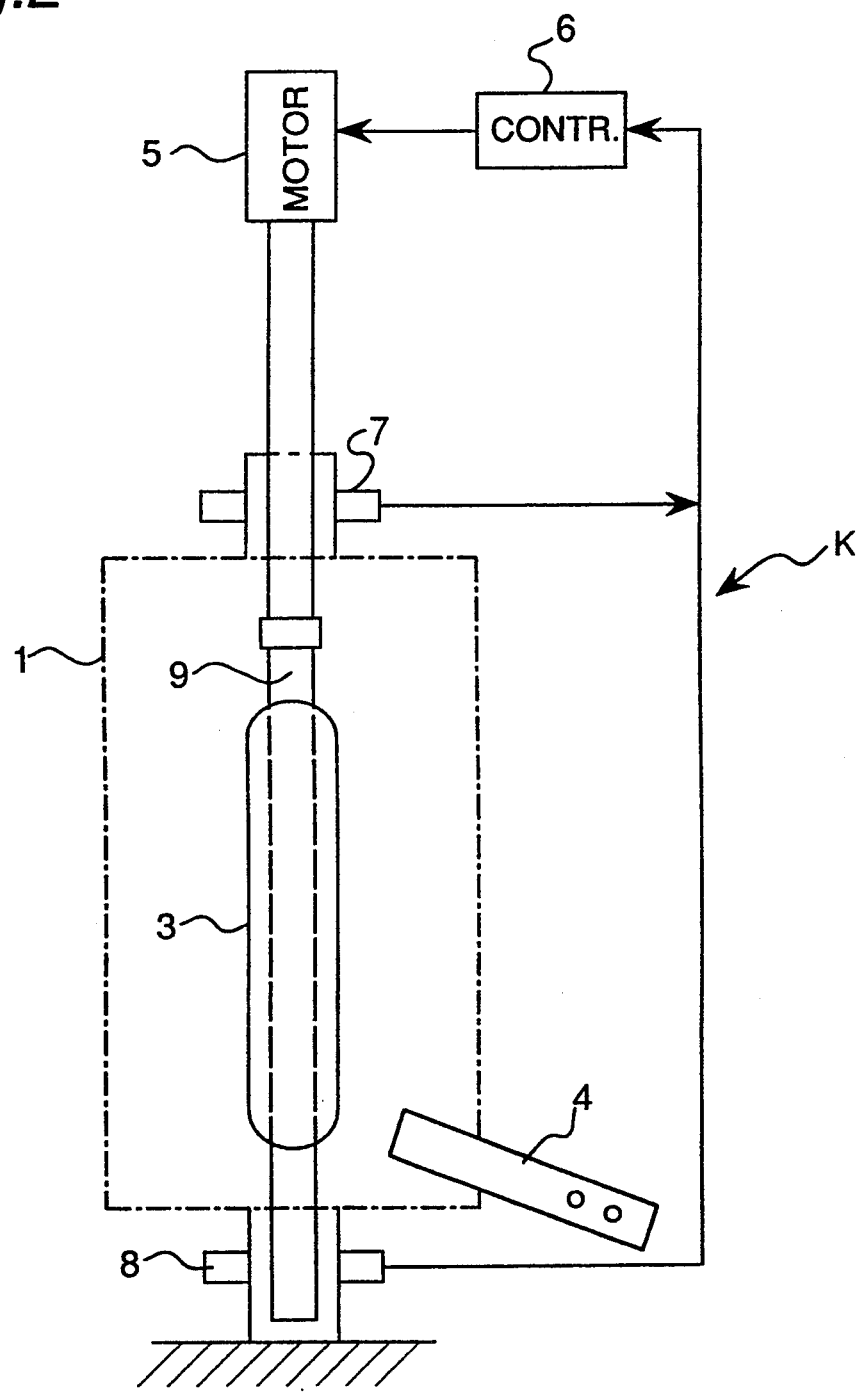
FIG. 2 is a schematic view showing a jacketing step in the apparatus of FIG. 1.

FIGS. 1 and 2 show a core forming step and a jacketing step, respectively, in an apparatus K for producing a glass preform by VAD, according to one embodiment of the present invention. In FIG. 1, the apparatus K includes a muffle 1, a starting rod 2, soot 3, a burner 4, a motor 5, a motor controller 6 and an upper vibration sensor 7. In FIG. 1, while the starting rod 2 fixed to a shaft of the motor 5 is being rotated at a predetermined speed, the soot 3 is deposited on a distal end of the starting rod 2 by the burner 4 by VAD. Meanwhile, in FIG. 2, the starting rod 2 of FIG. 1 is replaced by a core rod 9 obtained by vitrifying porous glass and a lower vibration sensor 8 is further provided. In FIG. 2, while the core rod 9 fixed to the shaft of the motor 5 is being rotated at a predetermined speed, the soot 3 is deposited on a periphery of the core rod 9 by the burner 4 by VAD. In both of FIGS. 1 and 2, deposition of the soot 3 is performed in the muffle 1.

Figure 3:
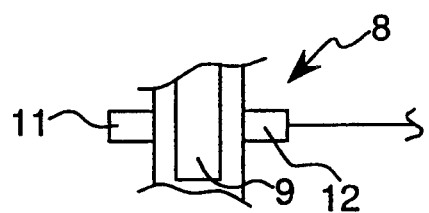
FIG. 3 is a schematic view of a vibration sensor according to the present invention.
Figure 4:
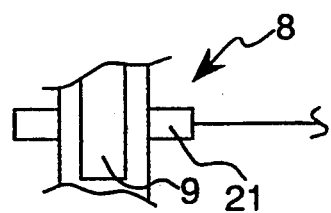
FIG. 4 is a schematic view of a vibration sensor according to another embodiment of the present invention.

As shown in FIG. 2, the lower vibration sensor 8 is disposed at a lower end portion of the core rod 9. If the lower vibration sensor 8 is capable of detecting the vibratory state of the core rod 9, the lower vibration sensor 8 may be based on any detection principle. As shown in FIG. 3, a light emitting element of laser beams, for example, a laser diode 11 and a photosensor, for example, a CCD (charge coupled device) 12 are employed as the lower vibration sensor 8 in this embodiment so as to detect transverse deflection of the distal end of the core rod 9 as positional change. Alternatively, as shown in FIG. 4, a photodiode 21 may be employed as the lower vibration sensor 8 so as to detect transverse deflection of the core rod 9 as change in quantity of light.

The motor 5 is controlled by the motor controller 6 so as to be rotated at a predetermined constant speed. In case vibrations of the starting rod 2 or the core rod 9 occur during deposition of the soot 3, the motor controller 6 receives output from the upper vibration sensor 7 or the lower vibration sensor 8 so as to change the rotational speed of the motor 5. By changing the rotational speed of the starting rod 2 or the core rod 9, the resonant state of the starting rod 2 or the core rod 9 can be terminated.

The natural frequency of the starting rod 2 or the core rod 9 does not necessarily change at a constant rate according to deposition speed of the soot 3, or the diameter of the soot 3, etc. In one example, the core rod 9 has an initial natural frequency of 8 Hz and the natural frequency of the core rod 9 decreases at an average change ratio of 1 Hz/80 min. Meanwhile, the critical speed of the core rod 9 leading to its vibrations depend on various factors such as rotational speed of the motor 5, bearings at a chuck, etc. When the natural frequency of soot material obtained by depositing the soot 3 on the core rod 9 coincides with the critical speed during deposition of the soot 3, violent vibrations of the soot material occur. Once vibrations of the soot material have occurred, the vibratory state of the soot material continues until the natural frequency of the soot material deviates from the critical speed with the progress of the deposition of the soot 3.

Measurements of the relationship between the natural frequency and the rotational speed of the core rod 9 were made by changing the natural frequency of the core rod 9 by attaching disklike weights to the core rod 9. When the natural frequency of the core rod 9 was deviated from the rotational speed of the core rod 9 by merely 0.1 Hz, the resonance of the core rod 9 was terminated. Thus, resonance of the core rod 9 takes place quite locally.

In the above mentioned example, the natural frequency of the core rod 9 is reduced at a ratio of about 1 Hz/80 min. Then, the natural frequency of the core rod 9 changes at a ratio of 0.1 Hz/8 min. upon deposition of soot. If deposition of soot continues without taking any action against vibrations of the core rod 9, the vibrations of the core rod 9 continue for about 10 min. until the natural frequency of the core rod 9 deviates from the rotational speed of the core rod 9 by 0.1 Hz. Meanwhile, once vibrations of the core rod 9 have occurred, vibrations of the core rod 9 are induced by its own vibrations and thus, are less likely to be damped even if the natural frequency of the core rod 9 deviates from rotational speed of the core rod 9.

However, supposing that the core rod 9 has a rotational speed of, for example, 40 rpm when the rotational speed is changed by merely about 1.2 rpm corresponding to 3% of the rotational speed in the apparatus K, vibrations of the core rod 9 can be damped, and thus, the core rod 9 can be rotated stably. When vibrations of the core rod 9 have been damped by changing the rotational speed, the state in which the rotational speed has been changed is maintained until natural frequency of the core rod 9 deviates from a resonant region. Thereafter, the core rod 9 is reinstated to the original rotational speed. By following this procedure, the vibratory state of the core rod 9 can be minimized.

In FIG. 2, the lower vibration sensor 8 is disposed at the lower portion of the core rod 9 but may also be provided in the vicinity of the shaft of the motor 5 or mounted directly on the shaft of the motor 5. In the core forming step of FIG. 1, vibrations of the shaft of the motor 5 are detected by the upper vibration sensor 7 as shown in FIG. 1. Any vibration detection means, for example, a strain meter attached to the shaft of the motor 5, may be employed as the upper vibration sensor 7 in addition to the above mentioned type which employs laser beams. In the jacketing step of FIG. 2, it is preferable, in view of the sensitivity thereof, to provide the vibration sensor at the lower portion of the core rod 9.

As is clear from the foregoing description of the apparatus for producing the glass preform by VAD, according to the present invention, vibration damping of the starting rod or the core rod can be performed by changing the rotational speed of the starting rod or the core rod. Consequently, the present invention achieves such an effect that the soot material can be produced stably.

What is claimed is:

1. An apparatus for producing a glass preform by VAD, comprising:
   rotational drive means for rotating soot material;
   detection means for detecting vibrations of the soot material; and
   control means for controlling rotational speed of said rotational drive means, which changes the rotational speed of said rotational drive means on the basis of a detection output of said detection means.

2. An apparatus as claimed in claim 1, wherein the detection means comprises a laser diode and a charge coupled device.

3. An apparatus as claimed in claim 1, wherein the detection means comprises a photodiode.

* * * * *

UNITED STATES PATENT AND TRADEMARK OFFICE
CERTIFICATE OF CORRECTION

PATENT NO. : 5,401,290
DATED : March 28, 1995
INVENTOR(S) : Nobuya Akaike

It is certified that error appears in the above-indentified patent and that said Letters Patent is hereby corrected as shown below:

Title page, item [56], line 2, under U.S. Patent Documents, change "Nakahana" to --Nakahara--.

Column 4, line 21, chnage "natural" to --the natural--.

Signed and Sealed this

Twelfth Day of December, 1995

Attest:

BRUCE LEHMAN

Attesting Officer

Commissioner of Patents and Trademarks